United States Patent [19]

Rogers et al.

[11] Patent Number: 4,537,607

[45] Date of Patent: Aug. 27, 1985

[54] GAS FLOW CONTROLLERS FOR AIRCRAFT MOLECULAR SIEVE TYPE GAS SEPARATION SYSTEMS

[75] Inventors: Brian H. Rogers; Paul A. Tucker, both of Yeovil, United Kingdom

[73] Assignee: Normalair-Garrett (Holdings) Limited, Yeovil, England

[21] Appl. No.: 636,265

[22] Filed: Jul. 31, 1984

[30] Foreign Application Priority Data

Aug. 3, 1983 [GB] United Kingdom ................. 8320960

[51] Int. Cl.[3] .............................................. B01D 53/04

[52] U.S. Cl. ........................................ 55/163; 55/179; 55/389

[58] Field of Search ................... 55/18, 20, 21, 62, 68, 55/75, 162, 163, 179, 180, 387, 389

[56] References Cited

U.S. PATENT DOCUMENTS

| | | | |
|---|---|---|---|
| 3,365,861 | 1/1968 | Crowley et al. | 55/162 |
| 3,507,097 | 4/1970 | Crowley et al. | 55/162 |
| 3,834,136 | 9/1974 | Dussourd et al. | 55/163 X |
| 3,922,149 | 11/1975 | Ruder et al. | 55/21 |
| 3,934,989 | 1/1976 | Haugen | 55/163 |
| 4,101,298 | 7/1978 | Myers et al. | 55/163 |
| 4,197,096 | 4/1980 | Sebastian et al. | 55/163 |
| 4,331,457 | 5/1982 | Morner | 55/163 |
| 4,404,005 | 9/1983 | Hamlin et al. | 55/179 X |
| 4,428,372 | 1/1984 | Beysel et al. | 55/25 X |
| 4,461,449 | 7/1984 | Turner | 251/62 |

FOREIGN PATENT DOCUMENTS

| | | | |
|---|---|---|---|
| 80300 | 6/1983 | European Pat. Off. | 55/179 |
| 2003742 | 3/1979 | United Kingdom | 55/18 |
| 2013101 | 8/1979 | United Kingdom | 55/179 |
| 2029257 | 3/1980 | United Kingdom | 55/21 |
| 2066693 | 7/1981 | United Kingdom | 55/163 |

*Primary Examiner*—Robert Spitzer

*Attorney, Agent, or Firm*—Larson and Taylor

[57] ABSTRACT

A gas flow controller 10 for use with a molecular sieve type oxygen enrichment of air system 5 delivering oxygen enriched air for breathing by aircrew ensures that a constant preset quantity of product gas in the form of oxygen enriched air flows from the system 5 so that it performs under varying demand conditions and varying air supply conditions to maintain desired levels of oxygen concentration in the oxygen enriched air delivered to the aircrew by means of a demand regulator 6 and a breathing mask 7. A servo-operated valve means 20 bleeds air from downstream of a venturi section 15 provided between in the inlet 13 and outlet 14 of a gas flow duct 12 in the body 11 of the controller 10. The servo-operated valve means 20 is regulated by an actuator means 29 responsive to pressure difference through the venturi section 15. An adjustment means 42 responsive to duct pressure upstream of the venturi section and either to varying cabin absolute pressure or to varying cabin differential pressure, applies a biasing force to the actuator means.

8 Claims, 1 Drawing Figure

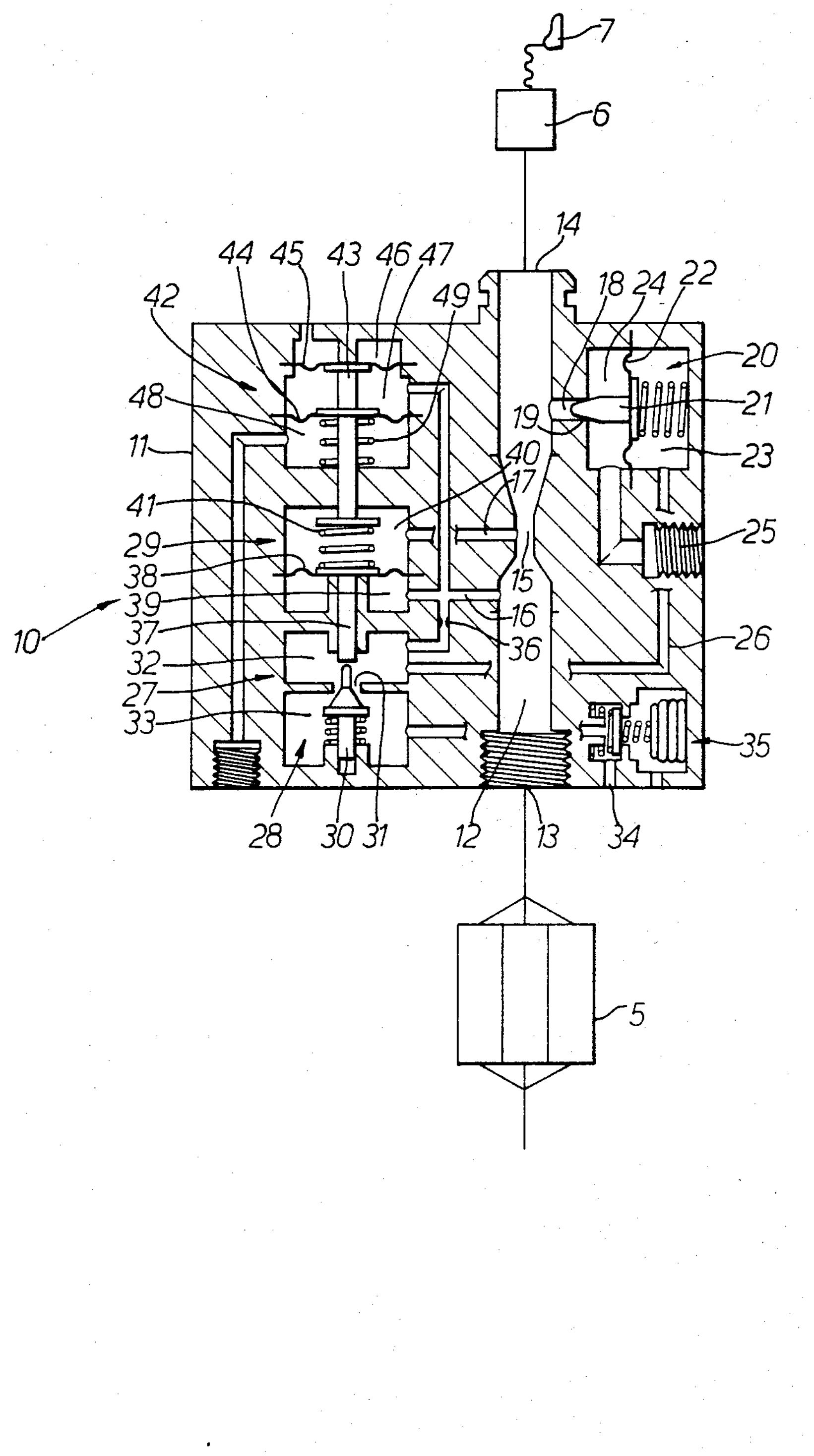
7
6
14
44 45 43 46 47
42
49
18 24 22
20
48
19
21
11
40
23
17
41
25
29
38
15
39
16
10
37
36
26
32
27
33
35
28
30 31
12
13
34
5

GAS FLOW CONTROLLERS FOR AIRCRAFT MOLECULAR SIEVE TYPE GAS SEPARATION SYSTEMS

BACKGROUND OF THE INVENTION (1) Field of the Invention

This invention relates to gas flow controllers for use with aircraft molecular sieve type gas separation systems and is more particularly concerned with a gas flow controller which is responsive to internal and external pressures so as to control the mass of air flowing through a molecular sieve type oxygen enrichment of air system supplying oxygen enriched air for breathing by aircrew.

(2) Description of the Prior Art

It is known to use a molecular sieve type gas separation system in an aircraft application to provide oxygen enriched air as breathable gas for aircrew. In this aircraft application air is bled from a compressor stage of a gas turbine engine used to power the aircraft, and supplied to the molecular sieve beds of the system by way of a pressure regulator and a heat exchanger. The sieve beds are usually operated in an overlapping sequence of fixed time cycles which comprise a charge/adsorption on-stream phase followed by a purge/-desorption regeneration phase. In the charge/adsorption phase nitrogen is adsorbed by sieve material in the bed and oxygen enriched air is delivered as product gas. In the purge/desorption phase a small portion of product gas from an on-stream bed is fed as a backflow through the bed that is in the purge/desorption phase so that nitrogen is desorbed and flushed from the sieve material and to place the bed into a cleansed condition preparatory to its next charge/adsorption phase.

Such systems were originally treated as a source of substantially pure oxygen to be utilised in a manner traditional in aircrew breathable gas systems supplied by a source of pure oxygen. Thus, because it is physiologically unacceptable to breathe air that is over-enriched with oxygen in relation to the ambient pressure, i.e. cabin pressure, to which the aircrew is being subjected, the substantially pure oxygen product gas is diluted with air.

However there are proposals for systems in which the sieve beds are induced to deliver product gas having a variable oxygen concentration adapted to the aircrew breathing requirements and in one such system disclosed in GB-A-2,029,257 (Linde), this is achieved by spilling varying amounts of product gas from the delivery line by means of a valve so that the rate of flow of air through the beds is increased, and the amount of nitrogen adsorbed per unit volume of air is reduced, as required to give a product gas of desired oxygen content.

Control means for a spill valve in this system generally comprises means sensing the concentration of oxygen in the product gas prior to its entry into the breathing mask of an aircrew member, means sensing the pressure within the aircraft cabin, and means comparing the sensed oxygen concentration with cabin pressure and translating the result into a spill valve control signal.

Other disclosures of aircraft molecular sieve type oxygen enrichment of air systems for supplying oxygen enriched air as breathable gas for aircrew are to be found in U.S. Pat. No. 3,922,149 and U.K. Patent Application No. 2,013,101A.

Two principal factors are concerned in any solution to the problem of regulating oxygen concentration in oxygen enriched air supplied by a molecular sieve type gas separation system for breathing by aircrew in an aircraft application. One factor is the dependence of the system performance on the ratio of the sieve bed charge pressure to the sieve bed vent pressure, the charge pressure being dependent upon supply gas pressure and the vent pressure on the pressure of the environment to which the bed is vented. The other factor is the physiological requirements of the aircrew which relates the partial pressure of oxygen to ambient pressure (i.e. the concentration of oxygen in the breathable gas must be appropriately related to cabin pressure).

SUMMARY OF THE INVENTION

We have found in respect of an aircraft molecular sieve type gas separation system, by analysis of these two factors, that desirable levels of oxygen concentration can be obtained by controlling the mass of air flowing through the system by means having a control datum that is a function of supply duct pressure and cabin pressure or cabin differential pressure (cabin pressure relative to aircraft altitude).

Whilst supply duct pressure is clearly related to the performance of such gas separation systems and is therefore relevant to the overall principles of their control, cabin altitude (cabin pressure) is of considerable relevance to the concentration of oxygen required to provide life support of an aircrew (i.e. the physiological requirement).

Consequently it is insufficient to control mass flow in the system solely in respect of duct pressure: it is also necessary to control the mass flow in such manner that changes in the aircrew oxygen requirement depending on cabin altitude are properly accommodated.

It is an object of the invention to provide a gas flow controller for controlling the mass of air flowing through a molecular sieve type oxygen enrichment of air system that utilises a fixed time cycle for its charge/adsorption and purge/desorption phases so as to regulate as required the concentration of oxygen in oxygen enriched air delivered by the system.

It is another object of the invention to provide an aircrew breathing system having a gas flow controller which achieves the required oxygen concentration regulation without having to sense the oxygen concentration in oxygen enriched air delivered by a molecular sieve type oxygen enrichment of air system.

Accordingly, in one aspect the present invention provides a gas flow controller for use in controlling the mass of air flowing through an aircraft molecular sieve type oxygen enrichment of air system, such flow controller having a gas flow duct connecting an inlet and an outlet by way of a venturi section, the inlet being arranged to receive product gas in the form of oxygen enriched air flowing from the molecular sieve beds of the oxygen enrichment of air system, and a servo-operated valve means for removing product gas from the gas flow duct downstream of the venturi section comprising a servo-operated valve regulated both by an actuator means responsive to pressure difference through the venturi section, and by adjustment means responsive to the difference between duct pressure upstream of the venturi section and one or more varying external pressures for applying a biasing force to the actuator means.

The adjustment means may be responsive to the differences between duct pressure upstream of the venturi section and, respectively, a first varying external pressure and a second varying external pressure.

In another aspect the present invention provides a breathing system for supplying oxygen-enriched air to aircrew of an aircraft, including a molecular sieve system arranged to deliver oxygen-enriched air as product gas by way of a gas flow controller and a demand regulator to a breathing mask, the gas flow controller comprising an inlet connected for receiving product gas delivered by the molecular sieve system, an outlet connected to the inlet by way of a product gas flow duct having a venturi section, servo-operated valve means for removing product gas from the product gas flow duct downstream of the venturi section, actuator means responsive to pressure difference through the venturi section for regulating a servo-operated valve of the servo-operated valve means, and adjustment means responsive to the difference between duct pressure upstream of the venturi section and one or more varying external pressures for applying a biasing force to the actuator means.

In this aspect of the invention the adjustment means may be responsive to the differences between duct pressure upstream of the venturi section and, respectively, aircraft cabin pressure and atmospheric pressure.

In one embodiment of the invention the servo-operated valve means is adapted for removing product gas from the gas flow duct by way of an outlet valve arrangement and a discharge chamber, said outlet valve arrangement comprising a poppet valve member controlled by a flexible diaphragm responsive to the difference in pressures in said discharge chamber and a control chamber connected with a pressure chamber of the servo-operated valve means.

The servo-operated valve means may be urged by a spring towards closing a portway which connects the said pressure chamber with an outlet chamber and the pressure chamber may have a further connection by way of an orifice with a pressure tapping upstream of the venturi section. The outlet chamber may have a connection with atmosphere external of the gas flow controller by way of a duct which is adapted for obturation by an altitude-sensing capsule valve arrangement.

The actuator means may comprise a piston controlled by a flexible diaphragm which is responsive to the difference between the pressures in two pressure chambers, one of said pressure chambers having a connection with the pressure tapping upstream of the venturi section and the other of said pressure chambers having a connection with a tapping from the throat section of the venturi, the piston having a stem which projects into the pressure chamber of the servo-operated valve, and a spring acting on that face of the piston away from the stem to urge the stem into contact with the servo-valve.

The adjustment means may comprise a slidable member having one end in contact with the spring which acts on the face of the piston of the actuator means, the slidable member projecting into a cavity defined by a body portion of the gas flow controller to be carried by two flexible diaphragms spaced along its length so as to divide the said cavity into three pressure chambers, the two end pressure chambers being open to pressure external of the gas flow controller and the intermediate chamber of said three pressure chambers having a connection to the pressure tapping upstream of the venturi section.

BRIEF DESCRIPTION OF THE DRAWING

An exemplary embodiment of the invention is now described with reference to the accompanying drawing which schematically illustrates a single planar section through the principal operating elements of a gas flow controller suitable for use with an aircraft molecular sieve type oxygen enrichment system.

DETAILED DESCRIPTION OF THE INVENTION

Referring to the drawing, a gas flow controller 10 includes a body unit 11 which provides a main gas flow duct 12 that is divided into an inlet 13, an outlet 14 and a venturi section 15. Connections with the main duct 12 are made, respectively, by pressure tappings 16, 17 in the entry and throat of the venturi section 15, and by a secondary outlet 18 in the main duct outlet 14.

The outboard termination of the secondary outlet 18 provides a valve seat 19 of an outlet valve arrangement 20 which further comprises a poppet valve member 21 urged towards closing onto the seat 19 by a spring and controlled by a flexible diaphragm 22 which separates a control chamber 23 from a discharge chamber 24. The discharge chamber 24 has an outflow duct 25. The control chamber 23 is connected by a passageway 26 to the pressure chamber of a servo-valve arrangement 27 which comprises a servo-valve 28 and a pneumatic actuator 29.

The servo-valve 28 comprises a poppet valve member 30, which is urged by a spring towards closing a portway 31 that connects the pressure chamber 32 with an outlet chamber 33. An outlet duct 34, which is obturated by an altitude (cabin pressure) sensing capsule arrangement 35, connects the chamber 33 with the exterior of the body unit 11. The capsule arrangement 35 is a snap action device that is shown in its open condition and is preset to operate and close the duct 34 when an increasing cabin altitude (decreasing cabin pressure) attains a predetermined value. The pressure chamber 32 is connected to the venturi high pressure tapping 16, i.e. main duct upstream pressure, by way of an orifice 36.

The pneumatic actuator 29 comprises a spring urged piston 37 which extends into the pressure chamber 32 and contacts the nose of the poppet valve 30. The piston 37 is carried by a pressure responsive diaphragm 38 that separates two pressure chambers 39, 40 of which the former connects with the venturi high pressure tapping 16 and the latter terminates the venturi throat pressure tapping 17. The spring 41 urging the piston 37 into contact witnh the poppet valve 30 acts in opposition to the spring force that urges the valve 30 towards closing.

A pressure-responsive adjustment means 42 is arranged to engage the opposite end of spring 41 from that end engaged by the piston 37 so as to provide adjustment of the force applied by the actuator 29. towards lifting the poppet valve 30 in opening the portway 31. The adjustment means 42 comprises a slidable elongate member 43 that is in axial abutment with the spring 41 at one end and limited in the extent of its sliding movement at the other end by a stop formed in the structure of the body unit 11. The elongate member 43 is attached to two spaced apart pressure responsive walls 44, 45 which divide a cavity in the body unit 11 into three pressure chambers 46, 47, 48 that are open, respectively, to cabin pressure, main duct upstream pressure (by way of the venturi high pressure tapping 16) and atmospheric pressure (i.e. aircraft altitude). The atmospheric pressure chamber 48 is adjacent to chamber 40 which senses venturi throat pressure and is separated from the cabin pressure chamber 46 by the upstream pressure chamber 47. The pressure responsive wall 45 which separates the cabin pressure chamber 46 from the upstream pressure chamber 47 is of a predetermined smaller effective area than that of the corresponding wall 44 separating this latter chamber 47 from the atmospheric pressure chamber 48. Chamber 48 houses a low rate spring 49 arranged to urge the elongate member towards its stop and which provides a predetermined force at working length for regulating the pneumatic load applied to the elongate member 43 by the difference in pressures in chambers 46, 48.

In operation the gas flow controller 10 is conduitly arranged in an aircrew breathable gas supply system between a molecular sieve type oxygen enrichment of air system 5 and a demand regulator 6 for feeding an aircrew breathing mask 7. When at rest, with no product gas being supplied by the system 5, ambient air pressure exists throughout the flow controller 10, and all the movable elements are held at rest by spring loads, as shown in the drawing. Thus the poppet valve 21 of the outlet valve arrangement 20 is seated, whilst the poppet valve 30 of the servo-valve arrangement 27 is held open by the actuator spring 41 which is unbiased by the adjustment means 42 because the elongate member 43 thereof is held (upwardly as seen in the drawing) by spring 49 against the body stop.

When product gas is being delivered to the main duct inlet 13, upstream duct pressure (substantially product gas delivery pressure) is obtained freely in chamber 47 between the pressure responsive walls 44, 45 of the pressure responsive adjustment means 42, and similarly so in chamber 39 of the servo-valve actuator 29, by way of the unrestricted branches of the pressure tapping 16. The same pressure is also obtained, but builds up more slowly, in inlet chamber 32 of the servo-valve arrangement 27 owing to the restriction to flow created by the orifice 36 in the branch of the pressure tapping 16 supplying chamber 32. Pressure in chamber 40 of the actuator 29 reduces to equate to that at the throat of the venturi section 15.

Neglecting at this juncture the operation of the adjustment means 42 other than to say that it moves off its stop, the difference in pressure created across the diaphragm 38 moves it in opposition to the compression spring 41 so that the force applied by the piston 37 on the nose of the servo-valve poppet valve 30 reduces and this moves into controlling position in obturation of the portway 31. This action regulates outflow from the pressure chamber 32 to ambient (cabin) by way of outlet chamber 33 and outlet duct 34, thereby controlling the pressure in chamber 32 and consequently that in chamber 23 of outflow valve arrangement 20, these last two chambers 32 and 23 being fluidly interconnected by passageway 26. The control pressure thus obtained in chamber 23 acts upon the diaphragm 22 and thereby causes the poppet valve 21 obturating the secondary outlet 18 to adopt a flow control position that (when there is no demand being made at the main duct outlet 14) removes a constant mass flow of product gas from the main duct 12 to cabin by way of duct 25.

However, when a breathing demand is made at the main duct outlet 14 and the increased flow through the venturi section 15 is sensed in chamber 40, by the pressure therein reducing, the effect of spring 41 on the piston 37 is reduced and the poppet valve 30 moves slightly towards closing with a consequent increase in control pressure in chamber 23 so that the poppet valve 21 is moved towards closing. There is thus a reduction in the flow of product gas from the duct 14 to duct 25 so that the same total mass flow of gas continues to pass through the controller 10 and, more importantly, through the oxygen enrichment of air system 5. According to the breathing demand the constant total mass flow of product gas is proportioned between the main duct outlet 14 and the secondary outlet 18.

The operation of the gas flow controller as so far described corresponds to ground running conditions with product gas being supplied by the molecular sieve type oxygen enrichment of air system 5, at constant pressure. However, in flight, the air delivery from the aircraft engine bleed system (not shown), and hence the product gas supply pressure, can vary according to the mode of flight, as of course does the difference in cabin and atmospheric pressures when the aircraft alters its altitude level.

The effect of varying gas supply pressure on the product gas flow rate is mitigated by the adjustment means 42, the upstream duct pressure sensed in chamber 47 being effective upon the difference in area of the two movable walls 44, 45 so that the position of the elongate member 43 is varied such that with reducing product gas pressure in the main duct the pressure in chamber 47 reduces and the member 43 moves towards its stop. Consequently less load is applied to the spring 41 of the actuator 29 with the result that the poppet valve 30 reduces outflow from the chamber 32 to cause increasing closure pressure to be applied to the poppet valve 21 of the outlet valve arrangement 20, thereby reducing the flow to cabin through outlet duct 25 and the total mass flow through the controller 10. With increased engine bleed delivery and a rise in product gas supply pressure in the main duct, the converse occurs and the total mass flow through the controller 10 is increased. The magnitude of these adjustments is arranged to maintain the performance of the system 5 to provide a desired oxygen content in the product gas.

The difference in cabin and atmospheric pressures is also effective upon the adjustment means 42, being sensed across the chamber 47 with cabin pressure present on the one side of the upper movable wall 45 and atmospheric pressure present on the opposite side of the lower movable wall 44. Increase in the pressure difference causes a force to be applied towards moving the elongate member onto the spring 41 and so lifting poppet valve 30 with consequential reduction of closure pressure on the poppet valve 21 of the outlet valve arrangement 30 to increase the total mass flow through the controller 10.

Thus adjustment means 42 provides an integrated response to change in engine bleed delivery pressure and to change in cabin differential pressure for biasing the poppet valve 30 of the servo-valve arrangement 27.

The cabin pressure sensing capsule arrangement 35 operates with a snap action to close the servo-valve arrangement outlet duct 34 when an increasing cabin altitude (decreasing cabin pressure) attains a preset value (equivalent to say a cabin altitude of 5,000 m) which causes the control pressure in the chamber 23 to build and be maintained at duct pressure and so clamp the poppet valve 21 into closure of the secondary outlet 18. This action prevents of the controller 10 passing any part of the total mass flow of product gas to cabin at this cabin altitude and higher, so that the total flow through the oxygen enrichment of air system 5 is reduced whereby the concentration of oxygen in the product gas of this system is increased.

It will be appreciated that this embodiment is by way of example only and constructional detail alternative to that hereinbefore described with reference to and shown in the accompanying drawing may be used and that modifications may be incorporated.

What is claimed is:

1. A gas flow controller for use in controlling the mass of air flowing through an aircraft molecular sieve type oxygen enrichment of air system, such flow controller having a gas flow duct connecting an inlet and an outlet by way of a venturi section, the inlet being arranged to receive product gas in the form of oxygen enriched air flowing from molecular sieve beds, and a servo-operated valve means for removing product gas from the gas flow duct downstream of the venturi section comprising a servo-operated valve regulated both by an actuator means responsive to pressure difference through the venturi section, and by adjustment means having at least one pressure responsive wall arranged to respond to the difference between duct pressure upstream of the venturi section and at least one varying external pressure conducted into the gas flow controller for applying a biasing force to the actuator means.

2. A gas flow controller as claimed in claim 1, wherein the adjustment means is responsive to the differences between duct pressure upstream of the venturi section and, respectively, a first varying external pressure and a second varying external pressure.

3. A gas flow controller as claimed in claim 1 wherein the servo-operated valve means is adapted for removing product gas from the gas flow duct by way of an outlet valve arrangement and a discharge chamber, said outlet valve arrangement comprising a poppet valve member controlled by a flexible diaphragm responsive to the difference in pressures in said discharge chamber and a control chamber connected with a first pressure chamber relieved by the servo valve of the servo-operated valve means.

4. A gas flow controller as claimed in claim 3, wherein the servo-operated valve means is urged by a spring towards closing a portway which connects the said first pressure chamber with an outlet chamber, the first pressure chamber having a further connection by way of an orifice with a pressure tapping upstream of the venturi section, and the outlet chamber having a connection with atmosphere external of the gas flow controller by way of a duct which is adapted for obturation by an altitude-sensing capsule valve arrangement.

5. A gas flow controller as claimed in claim 4, wherein the actuator means comprises a piston controlled by a flexible diaphragm which is responsive to the difference between the pressures in two actuator means pressure chambers, one of said actuator means pressure chambers having a connection with the pressure tapping upstream of the venturi section and the other of said actuator means pressure chambers having a connection with a tapping from the throat section of the venturi, the piston having a stem which projects into the first pressure chamber relieved by the servo valve, and a spring acting on that face of the piston away from the stem to urge the stem into contact with the servo-valve.

6. A gas flow controller as claimed in claim 5, wherein the adjustment means comprise a slidable member having one end in contact with the spring which acts on the face of the piston of the actuator means, the slidable member projecting into a cavity defined by a body portion of the gas flow controller to be carried by two flexible diaphragms spaced along its length so as to divide the said cavity into three adjustment means pressure chambers, the two end pressure chambers of said three adjustment means pressure chambers being open to pressure external of the gas flow controller and the intermediate chamber of said three adjustment means pressure chambers having a connection to the pressure tapping upstream of the venturi section.

7. A breathing system for supplying oxygen-enriched air to aircrew of an aircraft, including a molecular sieve system arranged to deliver oxygen-enriched air as product gas by way of a gas flow controller and a demand regulator to a breathing mask, the gas flow controller comprising an inlet connected for receiving product gas delivered by the molecular sieve system, an outlet connected to the inlet by way of a product gas flow duct having a venturi section, servo-operated valve means for removing product gas from the product gas flow duct downstream of the venturi section, actuator means responsive to pressure difference through the venturi section for regulating a servo-operated valve of the servo-operated valve means, and adjustment means having at least one pressure responsive wall arranged to respond to the difference between duct pressure upstream of the venturi section and at least one varying external pressures for applying a biasing force to the actuator means.

8. A breathing system as claimed in claim 7, wherein the pressure responsive walls of the adjustment means are responsive to the differences between duct pressure upstream of the venturi section and, respectively, aircraft cabin pressure and atmospheric pressure obtained by way of appropriately arranged ducts of the gas flow controller.

* * * * *